Nov. 21, 1961  L. G. STRIGGOW  3,009,367
BALL NUT CARTRIDGE
Filed Sept. 15, 1960  2 Sheets-Sheet 1
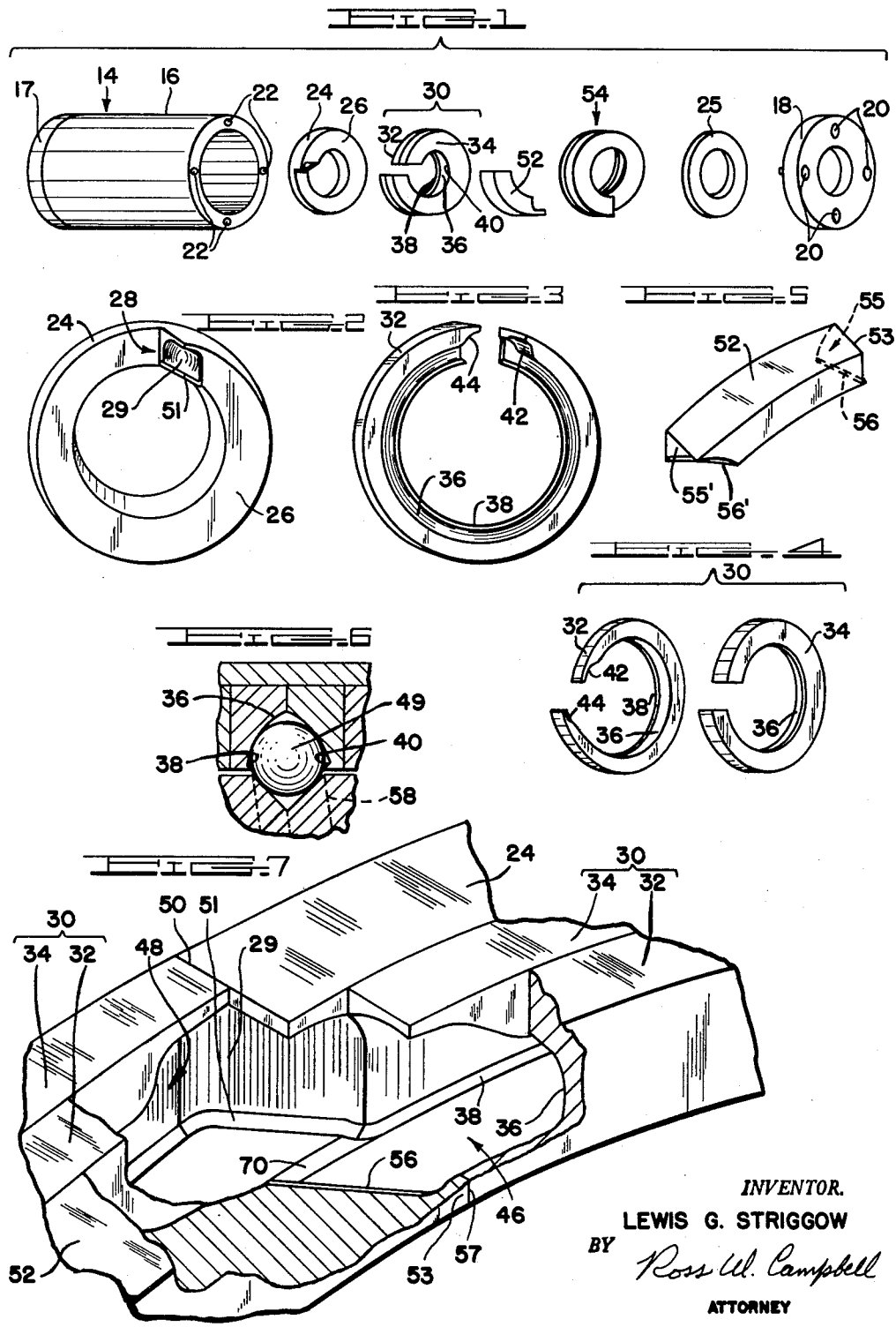
INVENTOR.
LEWIS G. STRIGGOW
BY Ross W. Campbell
ATTORNEY

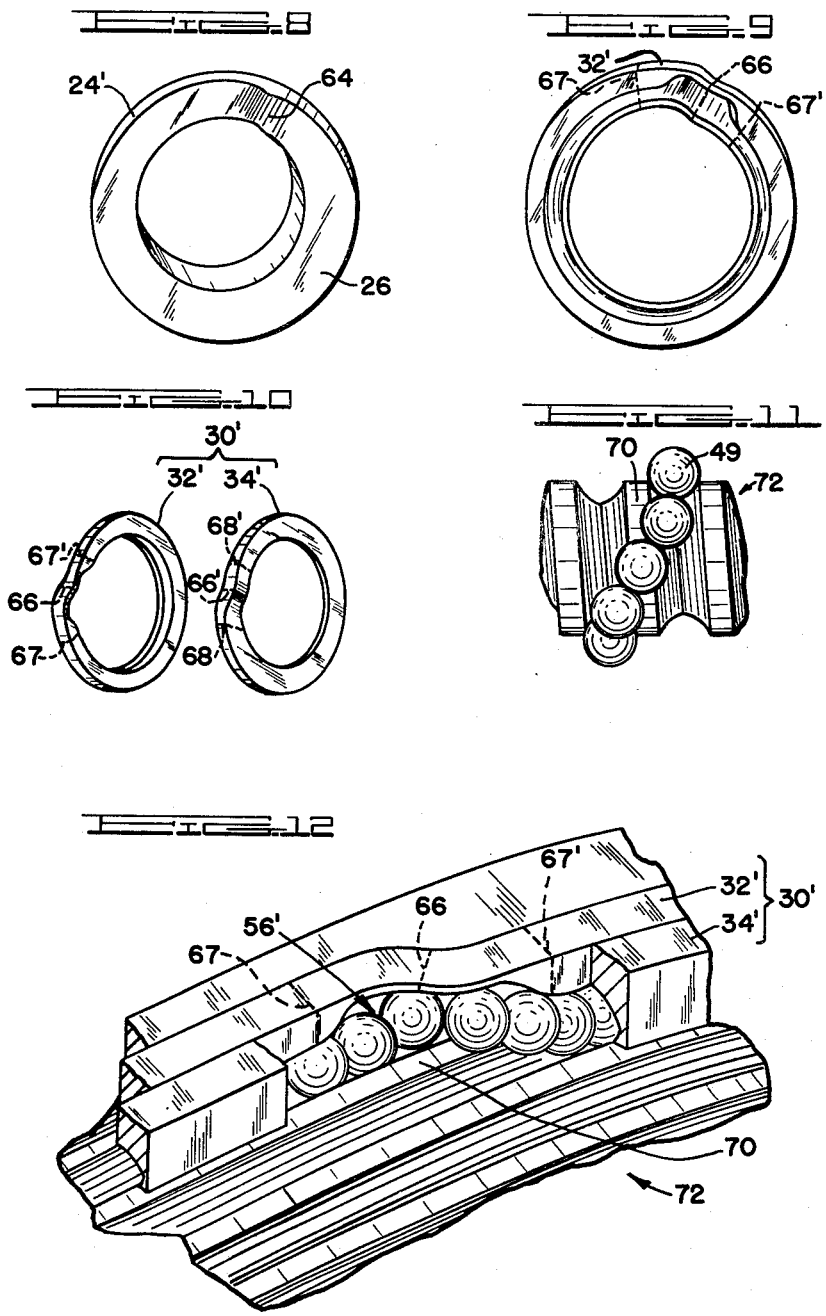

United States Patent Office 3,009,367
Patented Nov. 21, 1961

3,009,367
BALL NUT CARTRIDGE
Lewis G. Striggow, 1115 Marion Drive, Holly, Mich.
Filed Sept. 15, 1960, Ser. No. 56,159
6 Claims. (Cl. 74—459)

This invention relates to a ball bearing nut and more particularly to a ball bearing nut cartridge for use with a ball bearing screw.

A ball bearing screw assembly is, in general, a combination of a screw and mating nut, each having a concave, helical, ball bearing race in which rolling ball bearings act as the medium of engagement between the screw and nut.

The nut has been heretofore fitted with a tubular ball guide, generally using either a pick-up finger integral with the guide or a yoke-type deflector, which interrupts the path of the balls, deflects them from the helical race, guides them diagonally across the outside of the nut, and leads them back into the raceway, thus permitting the ball bearings to continually recirculate as the screw and nut are rotated relative to each other. The relative rotary motion of the screw and nut is thus changed to linear motion, or vice versa, with minimum frictional loss.

A tubular ball guide is provided for each or, more commonly, for a plurality of helical race sections of the nut. The presence of the tubular ball guide or guides external to the nut has proven inconvenient where packaging requirements necessitate a high degree of compactness. Further, the presence of the tubular ball guides outside of the nut render the guides vulnerable to damage. A further disadvantage of conventional ball bearing screw assemblies is that the ball bearings are held within their respective races only by the presence of the ball bearing screw threadably contained within the annulus of the nut; when the screw is removed, deliberately or by breakage, the ball bearings are free to leave the race and the nut under external forces such as gravity or centrifugal force, and are often lost. Even when not lost, replacement of the ball bearings into a conventional ball bearing nut is a tedious, meticulous, and time consuming process. Still further, conventional ball bearing nuts are made as single units and non-standard sizes thereof must be custom made at great expense.

One embodiment of the present invention includes an annular housing; a plurality of stacked, annular helical rings called helicoid sections, each having an internal, lipped, ball bearing race in the annular surface thereof; and a pair of cooperating, partial, ball bearing transfer sections at each end, respectively, of said race and helicoid section; a segment of a helical ring, called a helicoid transfer section, having a pair of oppositely disposed, lipped partial ball bearing transfer channels, respectively, at each end, matingly disposed between and abutting the proximate ends of each adjoining pair of helicoid sections; a pair of helicoid end sections, each having one plane face and one helical face to nest with an outer helicoid section, said helical face containing at its raised end a portion of a ball bearing transfer channel; the partial ball bearing transfer channels of each helicoid section cooperating with the partial ball bearing transfer channels of the pair of mating and abutting helicoid transfer sections, or helicoid transfer section and helicoid end section, to form a complete ball bearing transfer channel joining the opposing ends of the race of said helicoid section. a plurality of ball bearings within each ball bearing race and transfer channel; and a pair of annular flanges arranged to retain the helicoid sections, helicoid transfer sections, and helicoid end sections stacked within the annular housing.

The ball bearings act as the medium of engagement between the ball nut cartridge and a mating ball bearing screw having an external, helical ball bearing race, when the ball nut cartridge threadably surrounds the ball bearing screw.

When the ball nut cartridge and the ball bearing screw are rotated relative to each other, the ball bearings pass through the race and remain under load until they reach the ball transfer channel joining the ends of the race. The ball bearings are relieved from load as they enter the ball transfer channel. The ball transfer channel and the proximate portion of the thread of the screw cooperate to raise the ball bearings and diagonally over the thread of the screw and to cause the ball bearings to re-enter the opposing end of the same helicoid section and of the race contained therein.

A pair of opposing lips provided along the edges of the race of each helicoid section and ball bearing transfer channel reduce the widths of the race and channel to less than the diameter of the ball bearings therein contained, so as to retain the ball bearings within the race and channel when the ball bearing screw is removed from the ball nut cartridge.

It is accordingly an object of this invention to provide a ball nut cartridge having an internal, helical race and a plurality of ball bearings within said raceway wherein the path of the ball bearings is interrupted and the ball bearings deflected from the helical race diagonally over and across a ridge of the thread of the ball bearing screw, internally within the ball nut, and caused to re-enter the race to recirculate therein.

Another object of this invention is to provide a ball nut cartridge wherein the ball bearings may be recirculated without the necessity of utilizing a conventional tubular ball guide.

Still a further object is to provide a ball nut cartridge wherein ball bearings may be recirculated without the necessity of utilizing a conventional yoke-type deflector.

Still a further object of this invention is to provide a ball nut cartridge having a compact cross-section and having ball bearing recirculating means, said recirculating means being contained entirely within said compact ball nut cartridge.

Still a further object of this invention is to provide a ball nut cartridge having ball bearing recirculating means wherein said ball bearings remain constantly in contact with the thread of the ball bearing screw during transfer.

Still a further object of this invention is to provide a ball nut cartridge having a plurality of helicoid sections and helicoid transfer sections to form a ball nut cartridge of compact cross section and a variety of possible lengths.

Still a further object of this invention is to provide a ball nut cartridge having a plurality of stacked, annular helicoid ball bearing races with ball bearing transfer means integral therewith, to form a ball nut cartridge of compact cross section and a variety of possible lengths.

Still a further object of this invention is to provide a single annular helicoid ball bearing race and ball bearing transfer means cooperating therewith to form an interchangeable, recirculating ball bearing nut unit for use in a ball bearing cartridge.

Still a further object of this invention is to provide a ball bearing nut for use with a ball bearing screw wherein ball bearings are retained within said ball bearing nut when the ball bearing screw is separated therefrom.

Other objects and advantages of the invention will be apparent during the course of the following description.

In the accompanying drawings, forming a part of this specification, in which like characters are employed to designate like parts throughout the same, FIGURE 1 is an exploded perspective view of a ball nut cartridge.

FIGURE 2 is a perspective view of a helicoid end section.

FIGURE 3 is a perspective view of a mating half of a helicoid section.

FIGURE 4 is an exploded perspective view of a mating pair of mating halves of a helicoid section.

FIGURE 5 is a perspective view of a helicoid transfer section.

FIGURE 6 is a partial view in radial section of an assembled ball nut cartridge with a cooperating ball bearing and ball bearing screw.

FIGURE 7 is a perspective view partially in section of a helicoid section and cooperating helicoid transfer sections.

FIGURE 8 is a perspective view of a modified helicoid end section.

FIGURE 9 is a perspective view of a mating half of a modified helicoid section.

FIGURE 10 is an exploded perspective view of a mating pair of mating halves of a modified helicoid section.

FIGURE 11 is a partial view of a ball bearing screw and ball bearings in process of transfer.

FIGURE 12 is a perspective view partially in section of a modified helicoid end section, a modified helicoid section, a ball bearing screw, and ball bearings.

Referring now more particularly to the drawings, an elongated annular housing 14 is formed from a hollow metal cylinder 16 having a pair of annular flanges 17 and 18 attached, respectively, at each end thereof by conventional means such as cap screws (not shown) passing through apertures 20 and threadably engaged within internally threaded apertures 22.

A pair of identical helicoid end sections 24 and 25 are each formed from an annular metal ring and each has a flat face on one side and an external diameter sufficient to slidingly fit within the housing 14. If desired, mating serrations may be provided in the flat face of each helicoid end section and in the internal faces of annular flanges 17 and 18 so as to prevent rotation of the helicoid end sections with respect the annular flanges when the helicoid end sections are inserted within the housing in mating contact with the annular flanges. The other face of each helicoid end section forms a helical plane 26 terminating in a flat end 28. A portion of end 28 and helical plane 26 of each helicoid end section are removed to form a portion 29 of a lipped, ball bearing transfer channel. The internal diameter of helicoid end section 24 is identical to the internal diameter of annular flanges 17 and 18.

A helicoid section 30 is composed of two annular, mating helicoid half sections, 32 and 34. The division of a helicoid section into two mating half sections is not an essential feature of my invention but may be accomplished for ease of manufacture of the helicoid section. Helicoid section 30 is in the form of a helicoid the outer perimeter of which is a circular arc subtending a central angle of less than 360° of external diameter such as to slideably fit within housing 14, and of internal diameter identical to that of flanges 17 and 18 and of helicoid end sections 24 and 25. The annular surface of helicoid section 30 contains an internal, helical, ball bearing race 36 and a pair of parallel lips 38 and 40 attached respectively, to each side of the mouth of race 36.

A pair of enlarged channels 42 and 44 are formed in each end, respectively of helicoid half section 32, in extension of the portion of race 36 formed therein. A similar pair of enlarged channels (not shown) are similarly formed in helicoid half section 34. When the two helicoid half sections are then joined together to form helicoid section 30, a pair of partial ball bearing transfer channels 46 and 48 are formed, respectively, at each end thereof and in extension of each end of race 36. Partial ball bearing transfer channels 46 and 48 are each so formed as to diagonally face each other.

The walls of race 36 are preferably so shaped as to form in cross-section a Gothic arch so as to provide space for excess lubricant and foreign material which may accidently enter the race and to minimize interference thereof with the ball bearings traveling within the race. It will be noted that lips 38 and 40 do not extend below the annular face of helicoid section 30. Further, lips 38 and 40 extend across the opening of race 36 such a distance as to close the mouth of the race sufficiently to retain a ball bearing as 49, within the race of the helicoid section. For this purpose it is sufficient if the distance between the opposing crests of lips 38 and 40 is slightly less than the diameter of each of the ball bearings.

When the ball nut cartridge is assembled, helicoid end section 24 is inserted within annular housing 14 so that the flat face of helicoid end section 24 is in face to face contact with the internal face of flange 17. The faces thus in contact, if serrated, will mate and rotation prevented with respect to each other. Helicoid section 30 is then inserted so that a helical face thereof matingly fits with helical plane face 26 of helicoid end section 24, the proximate end of helicoid section 30 abutting the end 28 of helicoid end section 24 at joint 50. Any desired degree of fit may be obtained at joint 50 by machining end 28 of helicoid end section 24 and the mating end of helicoid section 30.

Partial ball bearing transfer channel 29 of helicoid end section 24 cooperates with partial ball bearing transfer channel 48 of helicoid section 30 so as to form one continuous, lipped wall of a ball bearing transfer channel. The lip 51 provided at the lower edge of partial ball bearing transfer channel 29 is similar to and disposed to mate with the corresponding lip 38 of helicoid section 30.

Helicoid ball transfer section 52 is a short segment of an annular helicoid having external cross-sectional dimensions and internal and external radii identical to those of helicoid section 30.

The ends 53 and 53' of helicoid transfer section 52 are flat and arranged to abut, respectively, the proximate ends of each of two adjoining helicoid sections 30 and 54. The ends of helicoid transfer section 52 are also channeled to form, respectively, a pair of partial ball bearing transfer channels 55 and 55', to mate, respectively, with the partial ball bearing transfer channels contained within the abutting ends of helicoid sections 30 and 54. A pair of lips 56 and 56' are provided, respectively, at an edge of each of said partial ball bearing transfer channels, similar to and to mate with the corresponding lips of the partial ball bearing transfer channels of helicoid sections 30 and 54, respectively. The abutting ends of helicoid section 30 and helicoid transfer section 52, respectively, may be machined to any desired degree of fit to form joint 57. It is important to note that helicoid transfer section 52, when arranged so as to abut the proximate end of helicoid section 30, lies parallel to and side by side with the other end of the same helicoid section, and that partial ball bearing transfer channel 55 of helicoid transfer section 52 cooperates with partial ball bearing transfer channel 46 of helicoid section 30 so as to form another continuous, lipped, wall of a ball bearing transfer channel. In combination, partial ball bearing transfer channels 46 and 48 of helicoid section 30, the partial ball bearing transfer section 29 of helicoid end section 24, and partial ball bearing transfer channel 55 of helicoid transfer section 52, form a complete, lipped, ball bearing transfer channel as best illustrated in FIGURE 7. The other end 55' of helicoid transfer section 52 similarly cooperates with the partial ball bearing transfer channels of helicoid section 54 and helicoid end section 25 to form a complete, lipped, ball bearing transfer channel connecting the ends of the race of helicoid section 54.

To assemble the ball nut cartridge, one end of hollow cylinder 16 is closed by attaching annular flange 17. Helicoid end section 24, helicoid section 30 helicoid transfer section 52, helicoid section 54, and helicoid end section 25 are then inserted within hollow cylinder 16, in turn, so as to nest against the inner face of flange 17 and each other, respectively. It will be noted that end 28 of helicoid end section 24 abuts the proximate end of helicoid section 30 and that the other end of helicoid section 30 and the ends of helicoid transfer section 52, helicoid section 54 and helicoid end section 25, respectively, similarly abut each other, in turn. Additional helicoid transfer sections and helicoid sections, in pairs, may be inserted between helicoid section 54 and helicoid end section 25, and a hollow cylinder 14 of corresponding additional length utilized, to form a ball nut cartridge of additional length equal to a selected multiple of thickness of pairs of helicoid transfer sections and helicoid sections. A plurality of ball bearings, each of diameter sufficient to be retained within the internal helicoid ball bearing race of a helicoid section and ball bearing transfer channel by the lips thereof, are inserted within the race of each helicoid section and accompanying ball bearing transfer channels, in turn, as the sections are inserted into cylinder 14, in number sufficient to completely fill each race and its accompanying ball bearing transfer channel.

Annular flange 18 is then attached to the other end of hollow cylinder 14 to retain the helicoid end sections, helicoid sections, and helicoid transfer sections snugly therein. The helical shape of the helicoid sections and helicoid transfer sections, and of the internal faces of the helicoid end sections, and their respective abutting ends, prevents them from rotating with respect to each other when the adjoining faces thereof are retained snugly in contact with each other by attachment of annular flanges 17 and 18 at the ends of hollow cylinder 14.

A ball bearing screw 58 of diameter and thread such as to mate with the ball nut cartridge and having a concave, helical race is then threadably engaged with the ball nut cartridge through the annulus thereof, in the conventional manner. The ball bearings are permitted to roll within the concave helical race of the ball nut cartridge and serve as the medium of engagement between the ball nut cartridge and the ball bearing screw, permitting them to rotate relative to each other with minimum friction loss. Each helicoid section with its cooperating, adjacent and abutting helicoid transfer sections, or helicoid transfer section and helicoid end section, forms a closed circuit through which the rolling ball bearings continually recirculate as the ball bearing screw and ball nut cartridge are rotated relative to each other. The rotary motion of the ball nut cartridge and ball bearing screw with respect to each other are thus changed to linear motion, or vice versa, with a minimum of loss due to friction.

As the ball nut cartridge and the ball bearing screw are rotated one complete revolution with respect to each other, the ball bearings within the helical race of each helicoid section and its cooperating ball bearing transfer channel make a complete 360° circumferential passage therethrough. As the ball bearings each emerge from the helical race into the ball bearing transfer channel each ball bearing, in response to the longitudinal motion of the thread of the ball bearing screw, with which it is in contact, and the pressure of ball bearings immediately behind it, is caused to be raised from the root of the thread of the screw, slideably upward along the leading flank of said thread, over and across the crest thereof, and downward along the following flank thereof into the next following root of the thread of said screw and into the opposite end of the same race from which it emerged, at the opposite end of the same helicoid section. The ball bearings within a single helicoid section and its cooperating ball bearing transfer channel thus continually recirculate therein as the ball bearing screw rotates within and with respect to the ball nut cartridge. When the direction of relative rotation of the ball bearing screw with respect to the ball nut cartridge is reversed, the direction of rotation of the ball bearings within each helicoid section and cooperating ball bearing transfer channel is also reversed, the ball bearings then recirculating in such opposite direction, still within the helical race and cooperating ball bearing transfer channel. The ball bearings remain under load only while within the race of the helicoid section; the internal configuration of each ball bearing transfer channel is such as to remove the ball bearings from load while they are within the ball bearing transfer channel.

When the ball bearing screw is removed from the ball nut cartridge, the ball bearings are retained within their respective races and transfer channels by the lips 38, 40, 51 and 56, or 38, 40, 56 and 56'.

Should a helicoid section, helicoid end section, or helicoid transfer section become damaged or worn, an identical replacement part may be easily substituted without the necessity of substituting a complete, new ball bearing nut. The standardization of parts of the ball nut cartridge affords lower cost of manufacture, repair, transportation of replacement parts, and convenience of manufacture and assembly.

The helicoid sections and helicoid transfer sections may be formed by cold rolling or by a sintering operation. The ends of the helicoid transfer sections, helcoid sections, and helcoid end sections may be machined so as to provide a fit of any desired tolerance. While I have shown and described the ball bearing race of the helcoid section as having the configuration of a Gothic arch, it is to be understood that my invention is not limited to this configuration but that any useful configuration may be utilized for said race.

Selectively fitted oversize ball bearings may be utilized in the races and ball bearing transfer channels in order to reduce backlash, as is sometimes conventionally done. Lash may be completely eliminated by the conventional method of using two ball bearing nuts on the same ball bearing screw, preloaded against one another.

It will be noted that when more than one helicoid section is employed in the ball nut cartridge, the radial lengths of the helicoid sections and helicoid transfer sections may be selected so as to balance the cartridge about its longitudinal axis. That is, if a pair of helicoid sections is employed, the use of a helicoid transfer section radians in length will offset the tendency to imbalance occasioned by the difference in cross-sectional density of the helicoid transfer section and helicoid sections. If three helicoid sections and two helicoid transfer sections are employed, and each of the latter is $\pi/2$ radians in length, the cartridge will similarly tend to be balanced about its longitudinal axis. Any remaining imbalance may be neutralized by discriminately weighting the annular housing 14.

Conventional coupling means may be provided for coupling the ball nut cartridge to other objects. For this purpose, an integral thread may be provided at one end of the ball nut cartridge to accommodate an annular, internally threaded flange for coupling use. Other coupling means, such as an internal trunion or external, may be used. Further, hollow cylinder 14, or flange 17, or both, may be formed integrally with an object to which the ball nut cartridge is desired to be thus coupled.

In one modification of my invention, the helicoid end section 24' may be provided with a curved surface 64, as shown in FIGURE 8, instead of a flat end, at the raised terminus of the helical plane face 26. In this modification, the mating halves 32' and 34' of the helicoid section 30' are each formed from a continuous annular ring having a portion of an internal, helical, ball bearing race therein and an enlarged channel connecting the ends of said portion of a race to form a portion of a ball transfer channel. FIGURE 9 shows a modified form of a mating half 32' of a helicoid section with a partial ball bearing transfer section integral therewith. The annular rings may each be split at one point, as at 66 and 66', to form a split helicoid section, as 30', if so required for purposes of manufacture or to obtain a tight fit within hollow cylinder 16. Modified mating halves 32' and 34', when joined, form helicoid section 30' containing an internal helical ball bearing race and an integral ball bearing transfer section 56'. It is to be particularly noted that in this modified form of my invention no separate helicoid transfer section is required, the function thereof being performed by the complete ball bearing transfer channel integrally contained within modified helicoid section 30' connecting the ends of the helicoid ball bearing race therein, as shown in FIGURE 12.

However, in yet another modification of my invention, a separate ball bearing transfer section can be formed for use with a modified helicoid section 30' by manufacturing separately the portions of mating halves 32' and 34' which contain partial ball bearing transfer sections, as indicated by dotted lines 67, 67', 68 and 68'. The ball bearing transfer section formed by joining the said portions of mating halves 32' and 34' will contain a complete ball bearing transfer channel therein and a pair of flat, non-channelled ends (not shown) to abut the pair of flat ends (not shown) of the remainder of helicoid section 30', the latter thus containing only lipped, helical, ball bearing race 36 of uniform cross section throughout its length.

In all forms of my invention the path of the ball bearings, while being transferred diagonally over a ridge 70 of the thread of the screw 72 to re-enter the race, is as shown in FIGURE 11.

It is to be understood that the forms of my invention herewith shown and described are to be taken as preferred examples of the same and that various changes in the shape, size, and arrangement of parts may be resorted to, without departing from the spirit of my invention or the scope of the subjoined claims.

What is claimed is:

1. In combination with a threadably engageable ball bearing screw, a ball nut cartridge comprising: an interrupted annular helicoid section having an internal concave helical ball bearing race and mutually cooperating partial ball bearing transfer channels at each end thereof; a pair of annular end sections each having an inner face consisting of a helical plane terminating in an end containing a partial ball bearing transfer channel, the inner faces of said end sections arranged to nest with the opposing faces of said helicoid section, respectively, and said ends of said end sections abutting the proximate ends of said helicoid section, respectively, to form therewith a ball bearing transfer channel; a plurality of ball bearings substantially filling said race and channel to engage the thread of said screw; said channel cooperating with said race and the thread of said screw to interrupt the helical transit of said ball bearings at the ends of said race and to transfer said ball bearings to the other end of said race for recirculation therein when said screw is threadably engaged within and rotated with respect to said cartridge; and means retaining said helicoid section intermediate said end sections and in cooperative contact therewith.

2. In combination with a threadably engageable ball bearing screw, a ball nut cartridge comprising: a plurality of identical interrupted annular helicoid sections each having an internal concave helical ball bearing race and mutually cooperating partial ball bearing transfer channels at each end of said race; a pair of annular end sections each having an inner face consisting of a helical plane terminating in an end containing a partial ball bearing transfer channel, cooperating with the proximate partial transfer channels of the outer pair of said helicoid sections, respectivley, to form therewith a pair of ball bearing transfer channels; a plurality of ball bearing transfer sections, having partial ball bearing transfer channels therein, cooperating respectively with each internal helicoid section to form therewith a ball bearing transfer channel joining the ends of the race of said section; a plurality of ball bearings substantially filling said races and channels to engage the thread of said screw, each channel cooperating with the race of the helicoid section with which it is associated and with the thread of said screw to interrupt the helical transit of said ball bearings at the ends of said race and to transfer said ball bearings to the other end of said race for recirculation therein when said screw is threadably engaged with and rotated with respect to said cartridge; and means retaining said helicoid sections, transfer sections, and end sections in cooperative contactual arrangement.

3. In combination with a threadably engageable ball bearing screw, a ball nut cartridge comprising: an annular housing; an interrupted annular helicoid section having an internal concave helical ball bearing race terminating in a pair of mutually cooperating partial ball bearing transfer channels; a pair of annular end sections each having an inner face consisting of a helical plane terminating in an end containing a partial ball bearing transfer channel, said inner faces arranged to nest with the opposing faces of said helicoid section, respectively, and said ends of said end sections arranged to abut the proximate ends of said helicoid section, respectively, to form therewith a complete ball bearing transfer channel; a plurality of ball bearings substantially filling said race and transfer section to engage the thread of said screw; a pair of mutually opposing lips attached to the sides of said race and channel near the mouths thereof, respectively, the distance between said pair of lips being less than the diameter of each of said ball bearings, to retain said ball bearings within said cartridge when said screw is disengaged from said ball bearings; said channel cooperating with said race and the thread of said screw to interrupt the helical transit of said ball bearings at the ends of said race and to transfer said ball bearings to the other end of said race for recirculation therein when said screw is threadably engaged within and rotated with respect to said cartridge; and annular flange means attached to said housing to retain said end sections and helicoid section within said housing.

4. In combination with a threadably engageable ball bearing screw, a ball nut cartridge comprising: an annular housing; a plurality of identical interrupted annular helicoid sections each having an internal concave helical ball bearing race and mutually cooperating partial ball bearing transfer channels at each end of said race, respectively; a pair of annular end sections each having an inner face consisting of a helical plane terminating in an end containing a partial ball bearing transfer channel, the inner faces arranged to nest with the outer faces of the outer pair of said helicoid sections, respectively, and said ends of said end sections arranged to abut the proximate ends of said outer pair of helicoid sections, respectively; a plurality of ball bearing transfer sections, having partial ball bearing transfer channels therein, arranged to abut the proximate ends of each adjacent pair of helicoid sections and to nest therebetween, to form with said other partial ball bearing transfer channels a plurality of individual complete ball bearing transfer channels each joining the ends of one of said races, respectively; a plurality of ball bearings substantially filling said races and channels to engage the thread of said screw; a pair of mutually opposing lips attached to the sides of each said race and channel near the mouths thereof, respectively, the distance between said pairs of lips being less than the diameter of each of said ball bearings, to retain said ball bearings within said cartridge when said screw is disengaged from said ball bearings; each said channel cooperating with its associated race and with the thread of said screw to interrupt the helical transit of said ball bearings at the ends of said race and to transfer said ball bearings to the other end of said race for recirculation therein when said screw is threadably engaged within and rotated with respect to said cartridge; and annular flange means attached to said housing to retain said end sections, helicoid sections, and transfer sections interlocked within said housing.

5. In a ball nut cartridge, in combination with a ball bearing screw and a plurality of ball bearings, the improvement comprising: an annular helicoid section including a helix-shaped portion and a shorter non-helix-shaped return portion joining the ends of the helix-shaped portion, said helix-shaped portion containing an internal concave helical ball bearing race and said return portion containing a ball bearing transfer channel joining the ends of said race; said ball bearings substantially filling said race and channel to engage the thread of said screw; a pair of oppositely disposed annular end sections each having an inner face arranged to nest with a face of said helicoid section, respectively; and means retaining said helicoid section intermediate said end sections and in cooperative contact therewith.

6. In a ball nut cartridge, in combination with a ball bearing screw and a plurality of ball bearings, the improvement comprising: a plurality of annular helicoid sections each having a helix-shaped portion and a shorter non-helix-shaped return portion joining the ends of said helix-shaped portion, said helix-shaped portion containing an internal lipped concave helical ball bearing race and said return portion containing a lipped ball bearing transfer channel joining the ends of said race; said ball bearings substantially filling said race and channel to engage the thread of said screw; a pair of oppositely disposed annular end sections each having an inner face arranged to nest with the outer faces of the outer pair of said helicoid sections, respectively, said lips being disposed to retain said ball bearings within each helicoid section when said screw is disengaged from said ball bearings; and means retaining said helicoid sections and end sections in cooperative contactual arrangement.

References Cited in the file of this patent

UNITED STATES PATENTS

| | | |
|---|---|---|
| 1,565,805 | Jones | Dec. 15, 1925 |
| 2,473,743 | Barnes | June 21, 1949 |
| 2,756,609 | Hogan et al. | July 31, 1956 |
| 2,770,155 | Morgan | Nov. 13, 1956 |
| 2,924,113 | Orner | Feb. 9, 1960 |